United States Patent
Chen et al.

(10) Patent No.: US 7,339,360 B2
(45) Date of Patent: Mar. 4, 2008

(54) SWITCHING VOLTAGE REGULATOR WITH AN IMPROVED RANGE OF INPUT VOLTAGE

(75) Inventors: Tien-Tzu Chen, Hsinchu (TW); Li-Cheng Chen, Kao-Hsiung (TW); Fang-Te Su, Kaohsiung County (TW)

(73) Assignee: Aimtron Technology Corp., Hsinchu (TW)

( * ) Notice: Subject to any disclaimer, the term of this patent is extended or adjusted under 35 U.S.C. 154(b) by 165 days.

(21) Appl. No.: 11/382,065

(22) Filed: May 8, 2006

(65) Prior Publication Data

US 2007/0257643 A1    Nov. 8, 2007

(51) Int. Cl.
*G05F 1/40* (2006.01)
*G05F 1/56* (2006.01)

(52) U.S. Cl. .................. 323/284; 323/271; 323/282

(58) Field of Classification Search ................ 323/222, 323/225, 265, 268, 271, 282, 284, 285
See application file for complete search history.

(56) References Cited

U.S. PATENT DOCUMENTS

| | | | |
|---|---|---|---|
| 4,849,869 A | 7/1989 | Tanuma et al. | |
| 5,705,919 A | 1/1998 | Wilcox | |
| 5,814,979 A | 9/1998 | Grimm | |
| 5,870,296 A * | 2/1999 | Schaffer | 363/65 |
| 5,955,872 A | 9/1999 | Grimm | |
| 6,100,675 A | 8/2000 | Sudo | |
| 6,212,079 B1 | 4/2001 | Balakrishnan et al. | |
| 6,469,565 B1 * | 10/2002 | Lee | 327/374 |
| 7,050,914 B2 * | 5/2006 | Tzeng et al. | 702/64 |
| 7,145,316 B1 * | 12/2006 | Galinski, III | 323/288 |

* cited by examiner

*Primary Examiner*—Matthew V. Nguyen
(74) *Attorney, Agent, or Firm*—Winston Hsu

(57) ABSTRACT

A switching voltage regulator has a first switch, a second switch, and an inductor, which are coupled together to a switch node. A switch control system applies a drive signal for controlling the first and the second switches. A duty cycle detecting circuit detects a duty cycle of the drive signal. When the duty cycle is larger than a predetermined threshold, the duty cycle detecting circuit generates an over-threshold signal. When the duty cycle is smaller than the predetermined threshold, the duty cycle detecting circuit generates an under-threshold signal. In response to the over-threshold signal and the under-threshold signal, an oscillating signal adjusting circuit generates an adjusting current. An oscillating signal generating circuit generates and applies an oscillating signal to the switch control system. The oscillating signal has a period adjusted by the adjusting current.

10 Claims, 7 Drawing Sheets

SWITCHING VOLTAGE REGULATOR WITH AN IMPROVED RANGE OF INPUT VOLTAGE

BACKGROUND OF THE INVENTION

1. Field of the Invention

The present invention relates to a switching voltage regulator and, more particularly, to a switching voltage regulator with an improved range of input voltage.

2. Description of the Related Art

FIG. 1(a) is a circuit diagram showing a conventional switching voltage regulator 10a. The switching voltage regulator 10a converts an input voltage $V_{in}$ into an output voltage $V_{out}$ for being supplied to a load Ld. A high-side switch SH is coupled between the input voltage $V_{in}$ and a switch node SN while a low-side switch SL is coupled between the switch node SN and a ground potential. As to the example of FIG. 1(a), the high-side switch SH is implemented by a PMOS transistor while the low-side switch SL is implemented by an NMOS transistor. An inductor L is coupled between the switch node SN and an output terminal O. An output capacitor $C_o$ is coupled to the output terminal O for filtering the output voltage $V_{out}$.

The switching voltage regulator 10a has an oscillating signal generating circuit 11 and a switch control system 15 constituted by a latch 12, a PWM control circuit 13, and a drive circuit 14. The oscillating signal generating circuit 11 generates a pulse oscillating signal PL and a ramp oscillating signal RM, both of which are in synchronization with respect to each other. The rising edge of the pulse oscillating signal PL is corresponding to the peak of the ramp oscillating signal RM while the falling edge of the pulse oscillating signal PL is corresponding to the valley of the ramp oscillating signal RM. The pulse oscillating signal PL is applied to a set terminal S of the latch 12 while the ramp oscillating signal RM is applied to the PWM control circuit 13. When the rising edge of the pulse oscillating signal PL triggers the latch 12 through the set terminal S, the drive signal DR from the output terminal Q of the latch 12 changes into the HIGH level. Through the drive circuit 14, the HIGH level of the drive signal DR turns on the high-side switch SH and turns off the low-side switch SL, such that the switching voltage regulator 10a enters the so-called ON operating phase. During the ON operating phase, the inductor current $I_L$ gradually increases.

A voltage feedback signal FV is representative of the output voltage $V_{out}$ while a current feedback signal FI is representative of the inductor current $I_L$. In response to the voltage feedback signal FV, the current feedback signal FI, and the ramp oscillating signal RM, the PWM control circuit 13 applies a control signal CS to a reset terminal R of the latch 12. Regardless of the current mode or the voltage mode adopted in the PWM control method, the drive signal DR from the output terminal Q of the latch 12 changes into the LOW level when the control signal CS triggers the latch 12 through the reset terminal R. Through the drive circuit 14, the LOW level of the drive signal DR turns off the high-side switch SH and turns on the low-side switch SL, such that the switching voltage regulator 10a enters the so-called OFF operating phase. During the OFF operating phase, the inductor current $I_L$ gradually decreases.

More specifically, the switching voltage regulator 10a shown in FIG. 1(a) belongs to the step-down type, i.e., converting a higher input voltage $V_{in}$ into a lower output voltage $V_{out}$. The step-down switching voltage regulator 10a has a duty cycle $D_a$ as expressed in the following equation (1a):

$$D_a \equiv \frac{T_{ON}}{(T_{ON} + T_{OFF})} = \frac{V_{out}}{V_{in}} \qquad (1a)$$

wherein $T_{ON}$ is representative of the time of the ON operating phase each period while $T_{OFF}$ is representative of the time of the OFF operating phase each period. The sum of $T_{ON}$ and $T_{OFF}$ equals to the period $T_S$ of the pulse oscillating signal PL (or the ramp oscillating signal RM).

As appreciated from equation (1a), $T_{ON}$ becomes longer when the input voltage $V_{in}$ becomes closer to the output voltage $V_{out}$. The increase of $T_{ON}$ causes $T_{OFF}$ to decrease since the period $T_S$ of the pulse oscillating signal PL is a constant. However, when the high-side switch SH is turned off from on and the low-side switch SL is turned on from off, a finite physical time is necessary for the accumulation and depletion of the charges. Therefore, $T_{OFF}$ must be limited to being larger than a predetermined minimum $T_{OFF, min}$ for allowing an appropriate switching operation to be possible. For example, when the minimum $T_{OFF, min}$ is set as 15% of the switching period $T_S$, the duty cycle $D_a$ has an upper limit of 0.85. In the case where the input voltage $V_{in}$ reduces to become lower than ($V_{out}/0.85$), the switching voltage regulator 10a fails to provide the regulated output voltage $V_{out}$ since $T_{OFF}$ has been shortened to reach its minimum $T_{OFF, min}$. Generally speaking, the conventional switching voltage regulator 10a is unable to provide the regulated output voltage $V_{out}$ when the input voltage $V_{in}$ is lower than $[T_S/(T_S-T_{OFF, min})]*V_{out}$.

FIG. 1(b) is a circuit diagram showing another conventional switching voltage regulator 10b. The switching voltage regulator 10b belongs to a step-up type, i.e., converting the lower input voltage $V_{in}$ into the higher output voltage $V_{out}$. In the step-up switching voltage regulator 10b, the high-side switch SH is coupled between the switch node and the output terminal O while the inductor L is coupled between the input voltage $V_{in}$ and the switch node SN. Moreover, the ON operating phase is executed through turning off the high-side switch SH and turning on the low-side switch SL, causing the inductor current $I_L$ to increase. The OFF operating phase is executed through turning on the high-side switch SH and turning off the low-side switch SL, causing the inductor current $I_L$ to decrease. The step-up switching voltage regulator 10b has a duty cycle $D_b$ as expressed in the following equation (1b):

$$D_b \equiv \frac{T_{ON}}{(T_{ON} + T_{OFF})} = \frac{(V_{out} - V_{in})}{V_{out}} \qquad (1b)$$

As appreciated from equation (1b), $T_{ON}$ becomes shorter when the input voltage $V_{in}$ becomes closer to the output voltage $V_{out}$. However, when the high-side switch SH is turned on from off and the low-side switch SL is turned off from on, a finite physical time is necessary for the accumulation and depletion of the charges. Therefore, $T_{ON}$ must be limited to being larger than a predetermined minimum $T_{ON, min}$ for allowing an appropriate switching operation to be possible. For example, when the minimum $T_{ON, min}$ is set as 15% of the switching period $T_S$, the duty cycle $D_b$ has an upper limit of 0.85. In the case where the input voltage $V_{in}$ rises to become higher than (0.85*$V_{out}$), the switching voltage regulator 10b fails to provide the regulated output voltage $V_{out}$ since $T_{ON}$ has been shortened to reach its minimum $T_{ON, min}$. Generally speaking, the conventional switching voltage regulator 10b is unable to provide the regulated output voltage $V_{out}$ when the input voltage $V_{in}$ is lower than $[(T_S-T_{ON, min})/T_S]*V_{out}$.

SUMMARY OF THE INVENTION

In view of the above-mentioned problems, an object of the present invention is to provide a switching voltage regulator with an improved range of input voltage.

According to one aspect of the present invention, a switching voltage regulator is provided for converting an input voltage into an output voltage. The switching voltage regulator has: a first switch; a second switch; an inductor, a switch control system, a duty cycle detecting circuit, an oscillating signal adjusting circuit, and an oscillating signal generating circuit. The first switch, the second switch, and the inductor are coupled together to a switch node. When the first switch is turned on and the second switch is turned off, an inductor current flowing through the inductor increases. When the first switch is turned off and the second switch is turned on, the inductor current decreases. The switch control system generates a drive signal to control the first switch and the second switch. The duty cycle detecting circuit detects a duty cycle of the drive signal. When the duty cycle is larger than a predetermined threshold, the duty cycle detecting circuit generates an over-threshold signal. When the duty cycle is smaller than the predetermined threshold, the duty cycle detecting circuit generates an under-threshold signal. In response to the over-threshold signal and the under-threshold signal, the oscillating signal adjusting circuit determines an adjusting current. The oscillating signal generating circuit generates and applies an oscillating signal to the switch control system. The oscillating signal has a period adjusted by the adjusting current.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 2:
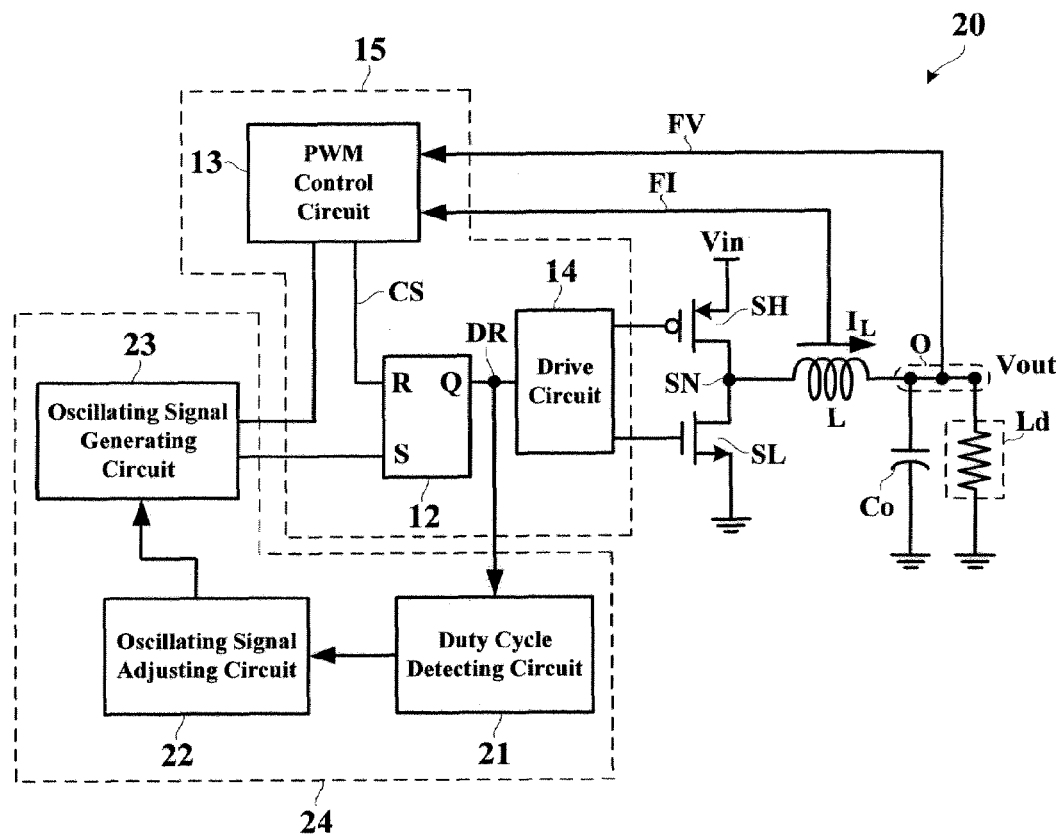
FIG. 2 is a circuit diagram showing a switching voltage regulator according to a first embodiment of the present invention.

FIG. 2 is a circuit diagram showing a switching voltage regulator 20 according to a first embodiment of the present invention. The switching voltage regulator 20 belongs to the step-down type, i.e., converting the higher input voltage $V_{in}$ into the lower output voltage $V_{out}$. The switching voltage regulator 20 has a switch control system 15 and an oscillating signal generating system 24. The switch control system 15 is constituted by a latch 12, a PWM control circuit 13, and a drive circuit 14. The oscillating signal generating system 24 is constituted by a duty cycle detecting circuit 21, an oscillating signal adjusting circuit 22, and an oscillating signal generating circuit 23.

More specifically, the duty cycle detecting circuit 21 detects the duty cycle $D_a$ of the drive signal DR. When the input voltage $V_{in}$ becomes closer to the output voltage $V_{out}$, the duty cycle $D_a$ of the drive signal DR becomes larger. When the duty cycle $D_a$ of the drive signal DR exceeds a predetermined threshold, the duty cycle detecting circuit 21 generates an over-threshold signal OT. In response to the over-threshold signal OT, the oscillating signal adjusting circuit 22 causes the oscillating signal generating circuit 23 to prolong the period $T_S$ of the pulse oscillating signal PL (and the ramp oscillating signal RM). As appreciated from equation (1a), a longer period $T_S$ allows a larger duty cycle $D_a$ to be possible since the minimum $T_{OFF, min}$ is constant. Moreover, the lower limit $[T_S/(T_S-T_{OFF, min})]*V_{out}$ of the applicable range of the input voltage $V_{in}$ is expanded closer to the output voltage $V_{out}$ when the period $T_S$ becomes longer. As a result, the switching voltage regulator 20 according to the present invention can be applied with a broader range of input voltage $V_{in}$.

On the other hand, for avoiding the period $T_S$ from being prolonged so much that the switching frequency becomes too low, the duty cycle detecting circuit 21 generates an under-threshold signal UT when the duty cycle $D_a$ of the drive signal DR becomes lower than the predetermined threshold. In response to the under-threshold signal UT, the oscillating signal adjusting circuit 22 causes the oscillating signal generating circuit 23 to shorten the period $T_S$ of the pulse oscillating signal PL (and the ramp oscillating signal RM).

Figure 3:
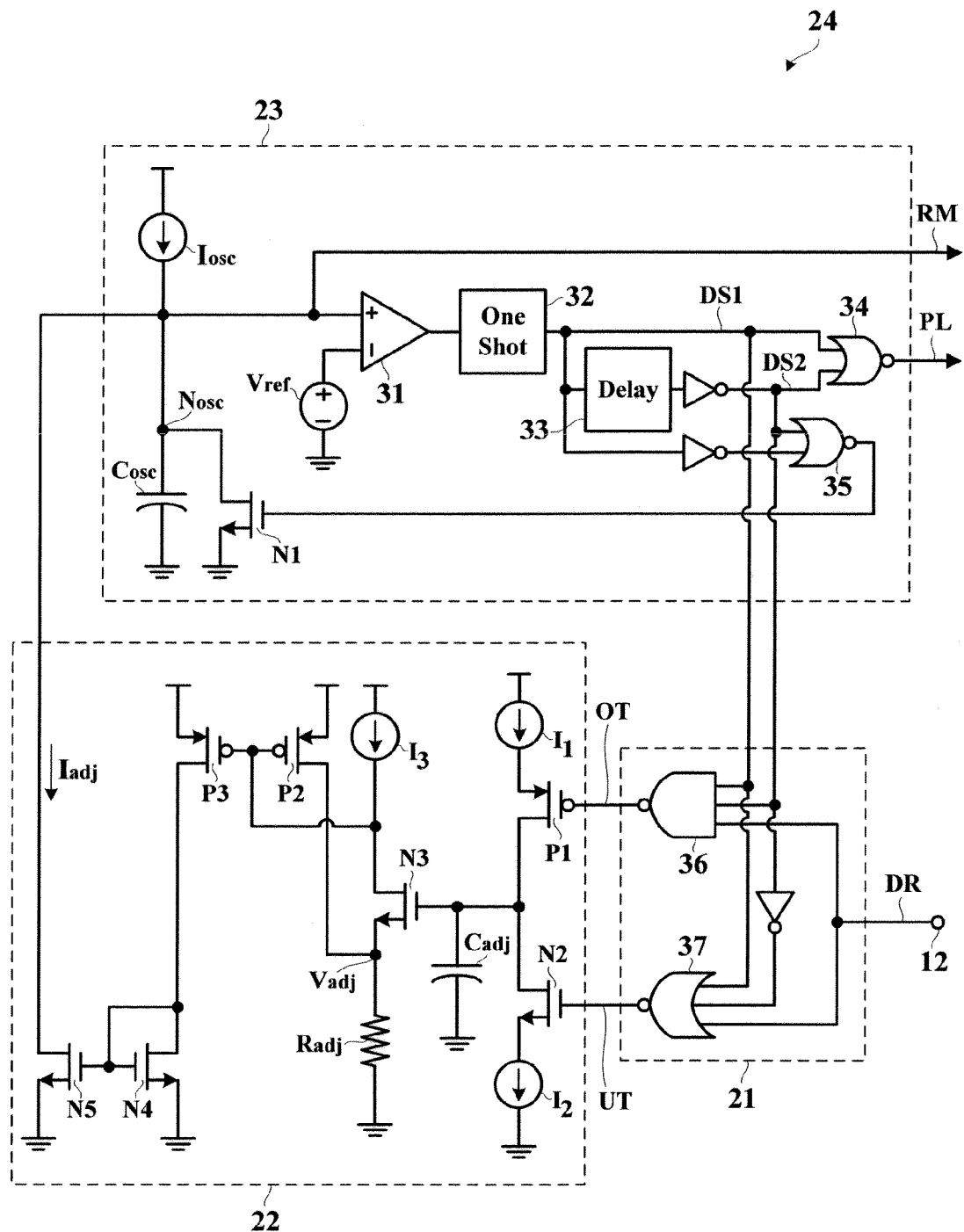
FIG. 3 is a detailed circuit diagram showing an oscillating signal generating system of FIG. 2.

Hereinafter is described in detail an operation of the oscillating signal generating system 24 according to the present invention with reference to FIGS. 3 and 4. First of all, it is assumed that an NMOS transistor N1 of the oscillating signal generating circuit 23 is turned on such that the voltage at the oscillating node $N_{osc}$ is reduced to the ground potential. Once the NMOS transistor N1 of the oscillating signal generating circuit 23 is turned off, an oscillating current source $I_{osc}$ starts charging an oscillating capacitor $C_{osc}$, causing the voltage at an oscillating node $N_{osc}$ to gradually increase. A comparator 31 has a non-inverting input terminal for receiving the voltage at the oscillating node $N_{osc}$, and an inverting input terminal for receiving a reference voltage source $V_{ref}$. When the voltage at the oscillating node $N_{osc}$ exceeds the reference voltage $V_{ref}$, the comparator 31 outputs a rising edge for triggering a one-shot circuit 32 to generate a first auxiliary signal DS1. Through a delay circuit 33 and then an inverter, the first auxiliary signal DS1 is transformed into a second auxiliary signal DS2. Therefore, the second auxiliary signal DS2 lags by a predetermined time dt and is out of phase with respect to the first auxiliary signal DS1. Subsequently through a NOR logic gate 34, the first and the second auxiliary signals DS1 and DS2 are coupled to from the pulse oscillating signal PL. Once the second auxiliary signal DS2 changes to the LOW level from the HIGH level, a NOR logic gate 35 outputs the HIGH level to turn on the NMOS transistor N1 such that the voltage at the oscillating node $N_{osc}$ is rapidly reduced to the ground potential. Therefore, the voltage at the oscillating node $N_{osc}$ is output for serving as the ramp oscillating signal RM.

The first and the second auxiliary signals DS1 and DS2 are applied to the duty cycle detecting circuit 21 for assisting the detection to the duty cycle $D_a$ of the drive signal DR. The first auxiliary signal DS1 is used for setting a threshold. In the duty cycle detecting circuit 21, an NAND logic gate 36 has three input terminals for receiving the first auxiliary signal DS1, the second auxiliary signal DS2, and the drive signal DR, respectively. When the duty cycle $D_a$ of the drive signal DR is smaller than the threshold set by the first auxiliary signal DS1, e.g., the first, the second, and the fifth periods PP1, PP2, and PP5 shown in FIG. 4, the NAND logic gate 36 outputs the LOW level. When the duty cycle $D_a$ of the drive signal DR is larger than the threshold set by the first auxiliary signal DS1, e.g., the third and the fourth periods PP3 and PP4 shown in FIG. 4, the NAND logic gate 36 outputs a pulse for serving as the over-threshold signal OT. It should be noted that the width of the pulse of the over-threshold signal OT is determined in accordance with a difference between the duty cycle $D_a$ of the drive signal DR and the threshold. The larger the difference between the duty cycle $D_a$ of the drive signal DR and the threshold, the larger the width of the pulse of the over-threshold signal OT. For example in FIG. 4, the over-threshold signal OT in the third period PP3 has a larger width of pulse than the over-threshold signal OT in the fourth period PP4.

On the other hand, in the duty cycle detecting circuit 21, the NOR logic gate 37 has three input terminals for receiving the first auxiliary signal DS1, the second auxiliary signal DS2 after inverted, and the drive signal DR. When the duty cycle $D_a$ of the drive signal DR is larger than the threshold set by the first auxiliary signal DS1, e.g., the third and the fourth periods PP3 and PP4 shown in FIG. 4, the NOR logic gate 37 outputs the LOW level. When the duty cycle $D_a$ of the drive signal DR is smaller than the threshold set by the first auxiliary signal DS1, e.g., the first, the second, and the fifth periods PP1, PP2, and PP5 shown in FIG. 4, the NOR logic gate 37 outputs a pulse for serving as the under-threshold signal UT. It should be noted that the width of the pulse of the under-threshold signal UT is determined in accordance with the difference between the duty cycle $D_a$ of the drive signal DR and the threshold. The larger the difference between the duty cycle $D_a$ of the drive signal DR and the threshold, the larger the width of the pulse of the under-threshold signal UT. For example in FIG. 4, the under-threshold signal UT in the first period PP1 has a larger width of pulse than the under-threshold signal UT in the second period PP2.

The over-threshold signal OT is applied to the oscillating signal adjusting circuit 22 for turning on a PMOS transistor P1 such that a current source $I_1$ starts charging an adjusting capacitor $C_{adj}$. Through a transistor N3, the potential difference across the adjusting capacitor $C_{adj}$ is level-shifted to form an adjusting voltage $V_{adj}$. The adjusting voltage $V_{adj}$ is applied across an adjusting resistor $R_{adj}$ to generate an adjusting current $I_{adj}$. Assumed that PMOS transistors P2 and P3 together form a 1×1 current mirror and NMOS transistors N4 and N5 together form another 1×1 current mirror, the same adjusting current $I_{adj}$ as described above is generated to flow through the drain and the source electrodes of the NMOS transistor N5. At the presence of the adjusting current $I_{adj}$, the current for charging the oscillating capacitor $C_{osc}$ in the oscillating signal generating circuit 23 is decreased to become ($I_{osc}-I_{adj}$). As a result, the rising rate of the voltage at the oscillating node $N_{osc}$ slows down so as to produce a longer period $T_S$ of the ramp oscillating signal RM (and the pulse oscillating signal PL). For example in FIG. 4, the third period PP3 generates the over-threshold signal OT, by which the fourth period PP4 is prolonged by $dT_1$ in comparison with the former period, and the fourth period PP4 also generates the over-threshold signal OT, by which the fifth period PP5 is prolonged by $dT_2$ in comparison with the former period. Because a longer period $T_S$ allows a larger duty cycle $D_a$ to be possible, the input voltage $V_{in}$ may decrease closer to the output voltage $V_{out}$, such that the switching voltage regulator 20 according to the present invention may be applied with a broader range of input voltage.

When the over-threshold signal OT has a wider pulse, the PMOS transistor P1 of the oscillating signal adjusting circuit 22 is kept on for a longer time, causing the adjusting voltage $V_{adj}$ to rise higher. As a result, a larger adjusting current $I_{adj}$ is generated to flow through the drain and the source electrodes of the NMOS transistor N5, thereby producing a longer period $T_S$ of the ramp oscillating signal RM (and the pulse oscillating signal PL).

The under-threshold signal UT is applied to the oscillating signal adjusting circuit 22 for turning on an NMOS transistor N2 such that a current source $I_2$ starts discharging the adjusting capacitor $C_{adj}$. As a result, the decrease of the potential difference across the adjusting capacitor $C_{adj}$ causes the adjusting voltage $V_{adj}$ and the adjusting current $I_{adj}$ to become lower. Because the current for charging the oscillating capacitor $C_{osc}$ in the oscillating signal generating circuit 23 is ($I_{osc}-I_{adj}$), the lower adjusting current $I_{adj}$ causes the rising rate of the voltage at the oscillating node $N_{osc}$ to become faster. For this reason, the period $T_S$ of the ramp oscillating signal RM (and the pulse oscillating signal PL) is shortened. For example in FIG. 4, the fifth period PP5 generates the under-threshold signal UT, by which the sixth period PP6 is shortened by $dT_3$ in comparison with the former period. Therefore, when the input voltage $V_{in}$ becomes closer to the output voltage $V_{out}$, the switching voltage regulator 20 according to the present invention automatically adjusts, i.e., either prolongs or shortens, the period $T_S$.

Figure 4:
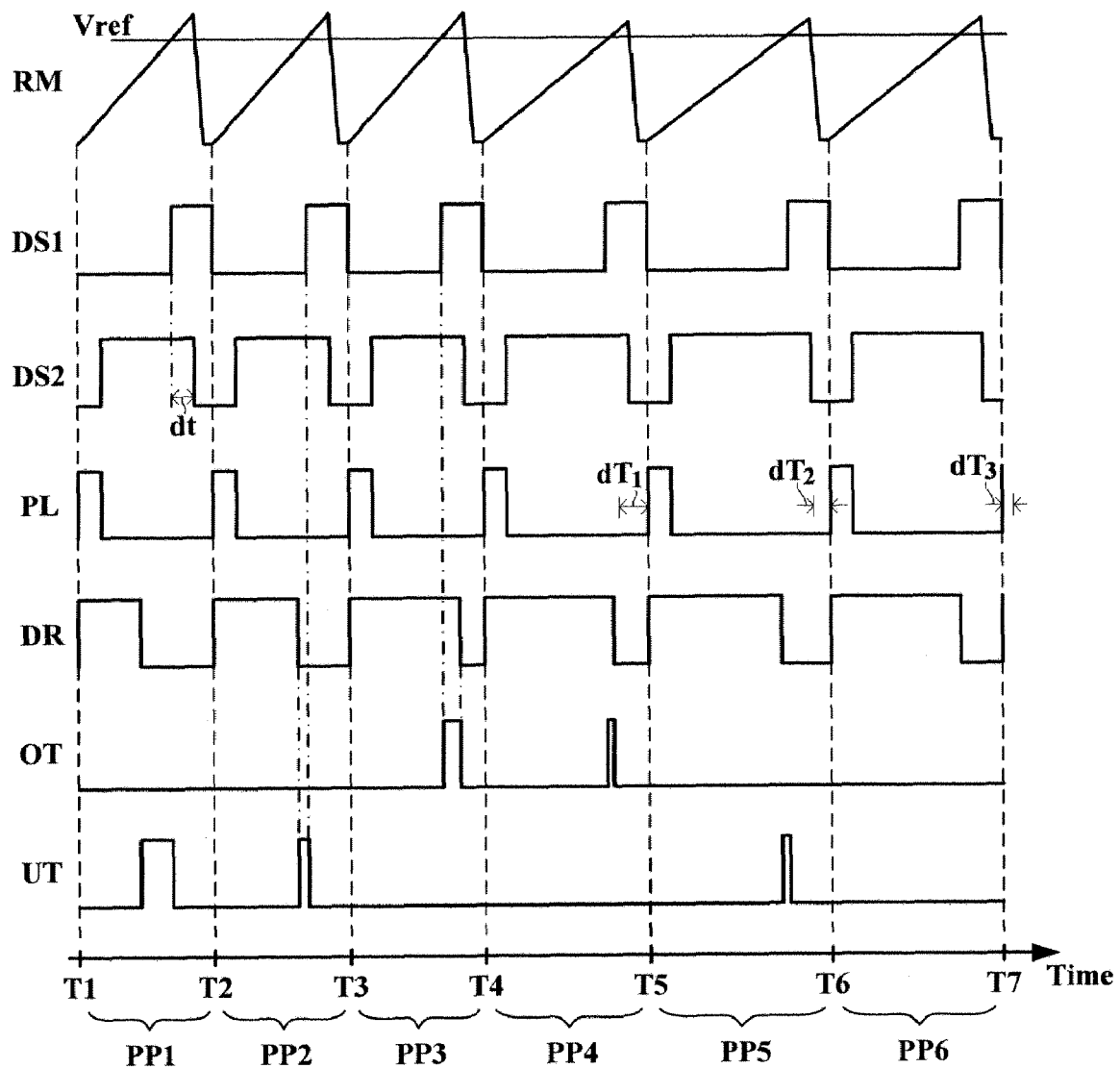
FIG. 4 is a waveform timing chart showing an operation of an oscillating signal generating system of FIG. 2.

It should be noted that when the difference between the input voltage $V_{in}$ and the output voltage $V_{out}$ becomes significantly large, the duty cycle $D_a$ of the drive signal DR is kept smaller than the threshold set by the first auxiliary signal DS1, e.g., the first and the second periods PP1 and PP2 shown in FIG. 4. In this case, the under-threshold signal UT is continuously applied to the oscillating signal adjusting circuit 22, causing the adjusting capacitor $C_{adj}$ to be continuously discharged until no potential difference exists across the adjusting capacitor $C_{adj}$. As a result, the period $T_S$ of the ramp oscillating signal RM (and the pulse oscillating signal PL) stays at the predetermined minimum.

Figure 5:
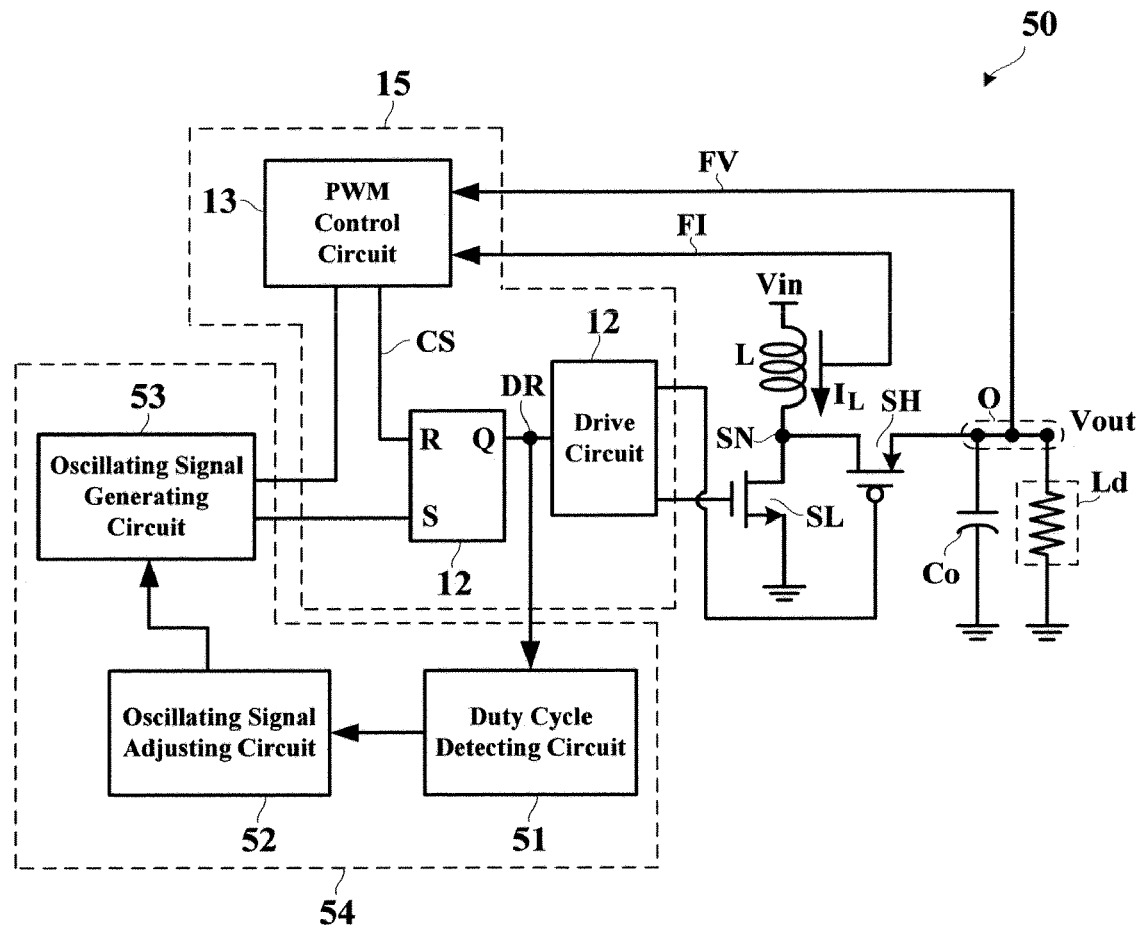
FIG. 5 is a circuit diagram showing a switching voltage regulator according to a second embodiment of the present invention.

FIG. 5 is a circuit diagram showing a switching voltage regulator 50 according to a second embodiment. The second embodiment shown in FIG. 5 is different from the first embodiment shown in FIG. 2 in that the switching voltage regulator 50 according to the second embodiment belongs to the step-up type, i.e., converting a lower input voltage $V_{in}$ into a higher output voltage $V_{out}$ for being supplied to the load Ld. Therefore in the switching voltage regulator 50, the high-side switch SH is coupled between the switch node SN and the output terminal O, the low-side switch SL is coupled between the switch node SN and the ground potential, and the inductor is coupled between the input voltage $V_{in}$ and the switch node SN.

Figure 1A:
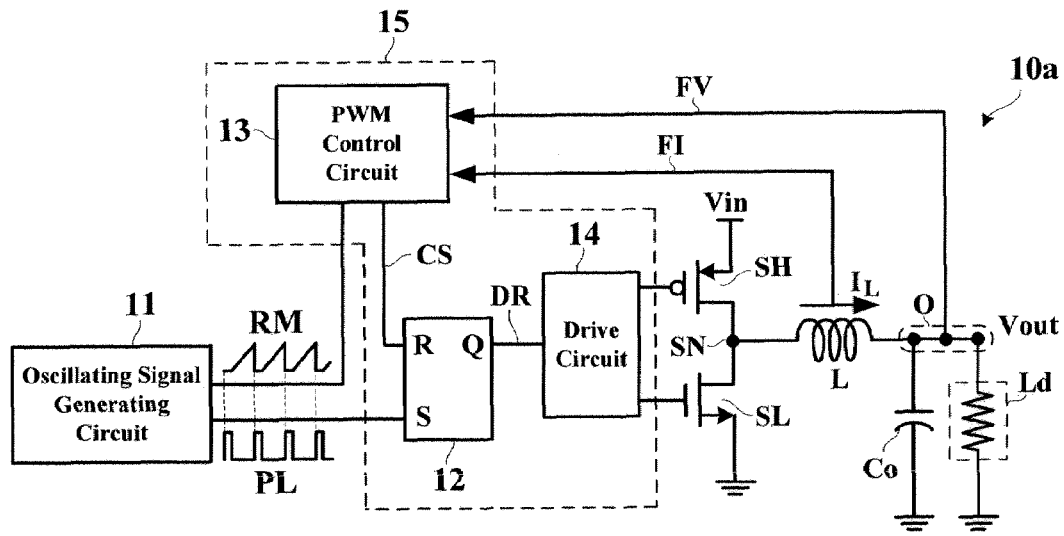
FIG. 1(a) is a circuit diagram showing a conventional switching voltage regulator.
Figure 1B:
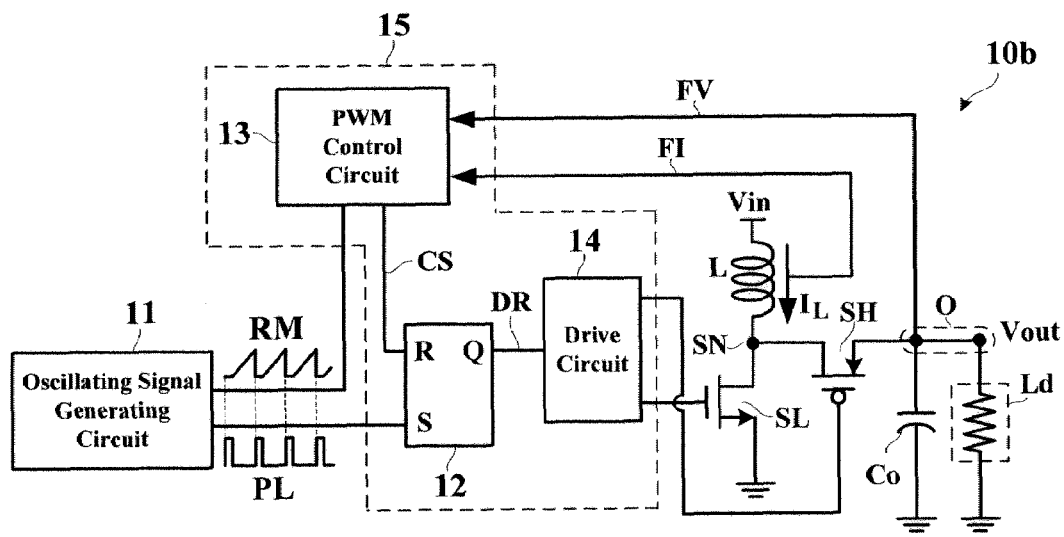
FIG. 1(b) is a circuit diagram showing another conventional switching voltage regulator.

The switching voltage regulator 50 is different from the conventional switching voltage regulator 10b shown in FIG. 1(b) in that the switching voltage regulator 50 employs an oscillating signal generating system 54 constituted by a duty cycle detecting circuit 51, an oscillating signal adjusting circuit 52, and an oscillating signal generating circuit 53. More specifically, the duty cycle detecting circuit 51 detects the duty cycle $D_b$ of the drive signal DR. When the input voltage $V_{in}$ becomes closer to the output voltage $V_{out}$, the duty cycle $D_b$ of the drive signal DR becomes smaller. When the duty cycle $D_b$ of the drive signal DR becomes smaller than a predetermined threshold, the duty cycle detecting circuit 51 generates an under-threshold signal UT. In response to the under-threshold signal UT, the oscillating signal adjusting circuit 52 causes the oscillating signal generating circuit 53 to prolong the period $T_S$ of the ramp oscillating signal RM (and the pulse oscillating signal PL). As appreciated from equation (1b), a longer period $T_S$ allows a larger duty cycle $D_b$ to be possible since the minimum $T_{ON,\ min}$ is constant. Moreover, the upper limit $[(T_S-T_{ON,\ min})/T_S]*V_{out}$ of the applicable range of the input voltage $V_{in}$ is expanded closer to the output voltage $V_{out}$ when the period $T_S$ becomes longer. As a result, the switching voltage regulator 50 according to the present invention can be applied with a broader range of input voltage $V_{in}$.

On the other hand, for avoiding the period $T_S$ from being prolonged so much that the switching frequency becomes too low, the duty cycle detecting circuit 51 generates an over-threshold signal OT when the duty cycle $D_b$ of the drive signal DR becomes larger than the predetermined threshold. In response to the over-threshold signal OT, the oscillating signal adjusting circuit 52 causes the oscillating signal generating circuit 53 to shorten the period $T_S$ of the ramp oscillating signal RM (and the pulse oscillating signal PL).

Figure 6:
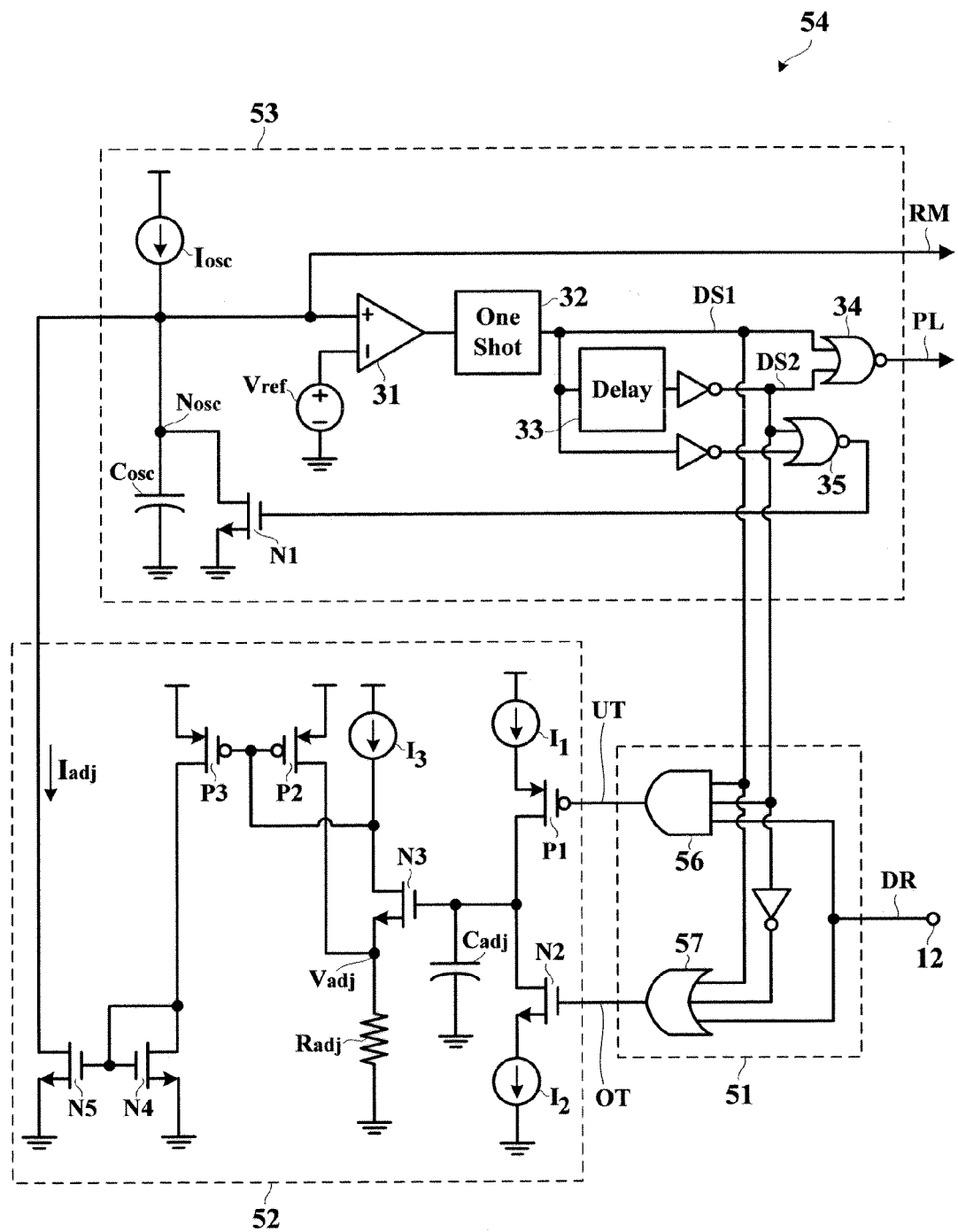
FIG. 6 is a detailed circuit diagram showing an oscillating signal generating system of FIG. 5.

FIG. 6 is a detailed circuit diagram showing the oscillating signal generating system 54 of FIG. 5. As seen from the comparison between FIG. 3 and FIG. 6, the oscillating signal generating system 54 of the second embodiment is different from the oscillating signal generating system 24 of the first embodiment in that the duty cycle detecting circuit 51 of the oscillating signal generating system 54 employs an AND logic gate 56 to generate the under-threshold signal UT and an OR logic gate 57 to generate the over-threshold signal OT.

Figure 7:
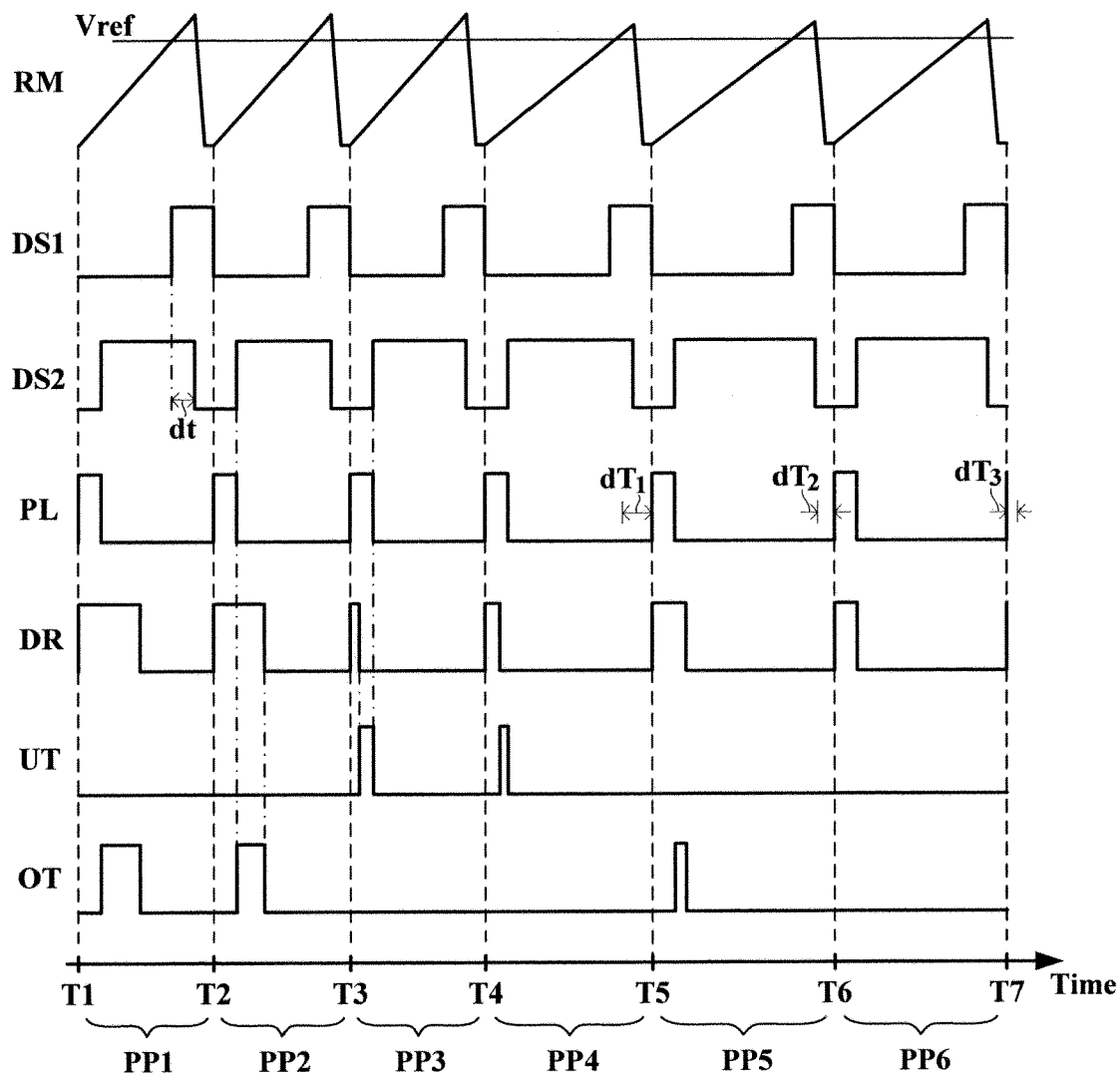
FIG. 7 is a waveform timing chart showing an operation of an oscillating signal generating system of FIG. 5.

FIG. 7 is a waveform timing chart showing an operation of the oscillating signal generating system 54 of FIG. 5. During the first and the second periods PP1 and PP2, the duty cycle $D_b$ of the drive signal DR is larger than a threshold set by the second auxiliary signal DS2, so the over-threshold signal OT is generated. Assumed that the period $T_S$ of the first period PP1 stays at the minimum, the second and the third periods PP2 and PP3 still stay at the minimum period. During the third period PP3, the duty cycle $D_b$ of the drive signal DR is smaller than the threshold set by the second auxiliary signal DS2, so is generated the under-threshold signal UT, by which the period of the fourth period PP4 is prolonged by $dT_1$ in comparison with the former period. During the fourth period PP4, the duty cycle $D_b$ of the drive signal DR is still smaller than the threshold set by the second auxiliary signal DS2, so is generated the under-threshold signal UT, by which the period of the fifth period PP5 is prolonged by $dT_2$ in comparison with the former period. During the fifth period PP5, the duty cycle $D_b$ of the drive signal DR becomes larger than the threshold set by the second auxiliary signal DS2, so is generated the over-threshold signal OT, by which the period of the sixth period PP6 is shortened by $dT_3$ in comparison with the former period. Therefore, when the input voltage $V_{in}$ becomes closer to the output voltage $V_{out}$, the switching voltage regulator 50 according to the present invention automatically adjusts, i.e., either prolongs or shortens, the period $T_S$.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A switching voltage regulator for converting an input voltage into an output voltage, comprising:
   a first switch;
   a second switch;
   an inductor, wherein the first switch, the second switch, and the inductor are coupled together to a switch node, such that when the first switch is turned on and the second switch is turned off, an inductor current flowing through the inductor increases, but when the first switch is turned off and the second switch is turned on, the inductor current decreases;
   a switch control system for generating a drive signal to control the first switch and the second switch;
   a duty cycle detecting circuit for detecting a duty cycle of the drive signal, such that when the duty cycle is larger than a predetermined threshold, the duty cycle detecting circuit generates an over-threshold signal, but when the duty cycle is smaller than the predetermined threshold, the duty cycle detecting circuit generates an under-threshold signal;
   an oscillating signal adjusting circuit for generating an adjusting current in response to the over-threshold signal and the under-threshold signal; and
   an oscillating signal generating circuit for generating and applying an oscillating signal to the switch control system, wherein the oscillating signal has a period adjusted by the adjusting current.

2. The switching voltage regulator according to claim 1, wherein:
   the over-threshold signal causes the oscillating signal adjusting circuit to increase the adjusting current, and the under-threshold signal causes the oscillating signal adjusting circuit to decrease the adjusting current.

3. The switching voltage regulator according to claim 1, wherein:
   the over-threshold signal causes the oscillating signal adjusting circuit to decrease the adjusting current, and the under-threshold signal causes the oscillating signal adjusting circuit to increase the adjusting current.

4. The switching voltage regulator according to claim 1, wherein:
   the larger the adjusting current, the longer the period of the oscillating signal is adjusted to become.

5. The switching voltage regulator according to claim 1, wherein:

when the adjusting current is zero, the period of the oscillating signal is at a minimum.

6. The switching voltage regulator according to claim 1, wherein:

the first switch is coupled between the input voltage and the switch node;

the second switch is coupled between the switch node and a ground potential; and the inductor is coupled between the switch node and the output voltage.

7. The switching voltage regulator according to claim 1, wherein:

the first switch is coupled between the switch node and a ground potential;

the second switch is coupled between the switch node and the output voltage; and the inductor is coupled between the input voltage and the output voltage.

8. The switching voltage regulator according to claim 1, wherein:

the input voltage is higher than the output voltage.

9. The switching voltage regulator according to claim 1, wherein:

the input voltage is lower than the output voltage.

10. The switching voltage regulator according to claim 1, wherein:

the switch control system has:

a PWM control circuit for generating a control signal in response to the output voltage, the inductor current, and the oscillating signal;

a latch for generating the drive signal in response to the oscillating signal and the control signal; and a drive circuit for controlling the first switch and the second switch in response to the drive signal.

* * * * *